United States Patent
Stavrou et al.

(10) Patent No.: US 9,043,818 B2
(45) Date of Patent: May 26, 2015

(54) ADAPTIVE FEEDBACK LOOP BASED ON A SENSOR FOR STREAMING STATIC AND INTERACTIVE MEDIA CONTENT TO ANIMALS

(71) Applicant: Fur Entertainment, Inc., Fairfax, VA (US)

(72) Inventors: Angelos Stavrou, Fairfax, VA (US); Margaret Lee Perry-Flippin, Chevy Chase, MD (US)

(73) Assignee: Fur Entertainment, Inc., Arlington, VA (US)

( * ) Notice: Subject to any disclaimer, the term of this patent is extended or adjusted under 35 U.S.C. 154(b) by 0 days.

(21) Appl. No.: 13/901,151

(22) Filed: May 23, 2013

(65) Prior Publication Data
US 2013/0318547 A1 Nov. 28, 2013

Related U.S. Application Data

(60) Provisional application No. 61/650,550, filed on May 23, 2012.

(51) Int. Cl.
| | |
|---|---|
| *H04H 60/56* | (2008.01) |
| *H04N 7/10* | (2006.01) |
| *H04N 7/025* | (2006.01) |
| *H04N 21/442* | (2011.01) |
| *H04N 21/4223* | (2011.01) |
| *H04N 21/466* | (2011.01) |

(52) U.S. Cl.
CPC ..... *H04N 21/44218* (2013.01); *H04N 21/4223* (2013.01); *H04N 21/466* (2013.01)

(58) Field of Classification Search
None
See application file for complete search history.

(56) References Cited

U.S. PATENT DOCUMENTS

| 7,716,551 B2 | 5/2010 | Barkley et al. | |
| 7,716,697 B2 * | 5/2010 | Morikawa et al. | 725/10 |
| 8,346,206 B1 | 1/2013 | Andrus et al. | |
| 2003/0161447 A1 * | 8/2003 | Kind | 379/88.13 |
| 2012/0124604 A1 * | 5/2012 | Small et al. | 725/12 |
| 2013/0104812 A1 * | 5/2013 | Levi et al. | 119/712 |
| 2013/0243270 A1 * | 9/2013 | Kamhi et al. | 382/118 |

FOREIGN PATENT DOCUMENTS

| WO | WO 2011135572 A1 * | 11/2011 | G09B 19/00 |

* cited by examiner

*Primary Examiner* — Nathan Flynn
*Assistant Examiner* — William J Kim
(74) *Attorney, Agent, or Firm* — Maier & Maier, PLLC

(57) ABSTRACT

A system or method for inferring and selective display of visual and sound media content based on a pet(s)'s level of engagement or reactions to content displayed on any number of content display devices including, but not limited to, television screens, computer monitors, tablets, and cell phones and measured by a sensor. A content selection algorithm takes as input the sensor measurements and historical or pre-computed data to infer the pet(s)'s preference for content. A content modification algorithm interposes algorithmically computed shapes and sounds overlaid on top of the existing content to attract the attention of the pet(s) observing the display.

11 Claims, 3 Drawing Sheets

ADAPTIVE FEEDBACK LOOP BASED ON A SENSOR FOR STREAMING STATIC AND INTERACTIVE MEDIA CONTENT TO ANIMALS

CROSS-REFERENCE TO RELATED APPLICATIONS

This application claims the benefit of U.S. Provisional Application No. 61/650,550, filed May 23$^{rd}$ 2012, entitled "Adaptive Feedback Loop Based On A Sensor For Streaming Static And Interactive Media Content To Animals", which is hereby incorporated by reference in its entirety.

BRIEF DESCRIPTION OF THE SEVERAL VIEWS OF THE DRAWINGS

The accompanying drawings, which are incorporated in and form a part of the specification, illustrate embodiments of the present invention and, together with the description, serve to explain the principles of the invention.

DETAILED DESCRIPTION OF EMBODIMENTS

Figure 1:
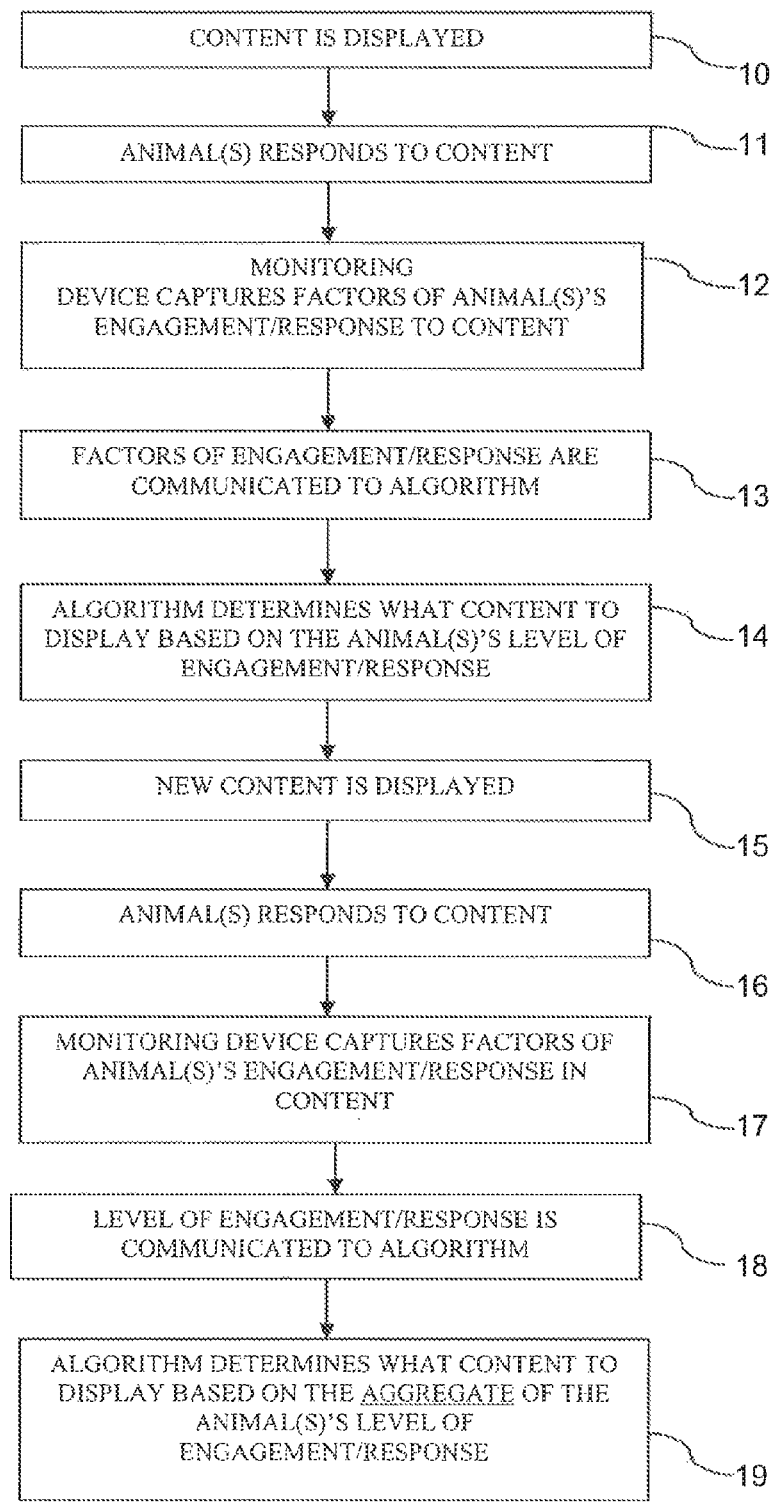
FIG. 1 is a flow diagram illustrating the process in which content is adjusted according to a pet(s)'s engagement/reactions.

Embodiments of the present invention enables the inference and selective display of visual and sound media content, called simply "content", based on a pet(s)'s level of engagement or reactions to content displayed on any number of content display devices including, but not limited to, television screens, computer monitors, tablets, and cell phones. As detailed in FIG. 1, the invention utilizes a sensor monitoring device 12 such as, but not limited to, an imaging or infrared camera or a motion sensor, called "SENSOR" to measure a pet(s)'s engagement/reaction 11 to displayed content 10 which is communicated to an algorithm 13.

The display of content is determined by a content determination algorithm taking as input the available content and the data collected by the SENSOR and other historical or pre-computed data. The algorithm determines what content a pet(s) would be most likely be engaged by based on the pet(s) reaction/response to the content displayed including, but not limited to, current and previous content 14.

A continuous feedback loop is created between the SENSOR data and the algorithm for content determination. The level of pet(s)'s engagement is captured by the SENSOR device and interpreted by the algorithm. New content is provided based on the output of the algorithm 15.

The pet reacts to the newly displayed content 16.

The SENSOR measures the pet(s)'s engagement/reactions to the newly displayed content 17. The SENSOR data are communicated to the algorithm 18.

The algorithm computes what content to display based on the individual and aggregate SENSOR data indicating the pet(s)'s level of engagement/response 19.

For example, SENSOR feedback from the device may indicate that a particular pet(s) was engaged by birds. The content determination algorithm then determines what other types of content the particular pet(s) would be interested in based on the pet(s)'s interest in birds.

The system generates a continuous feedback loop offering an adaptive viewing experience for the pet(s) based on its engagement/reactions.

The invention can utilize the aggregate of all data provided by the feedback loop and other historical or pre-computed data to continuously improve the feedback loop.

For example, if it was discovered that pets interested in birds were also typically interested in insects, the content determination algorithm is adjusted for that discovery.

Figure 2:
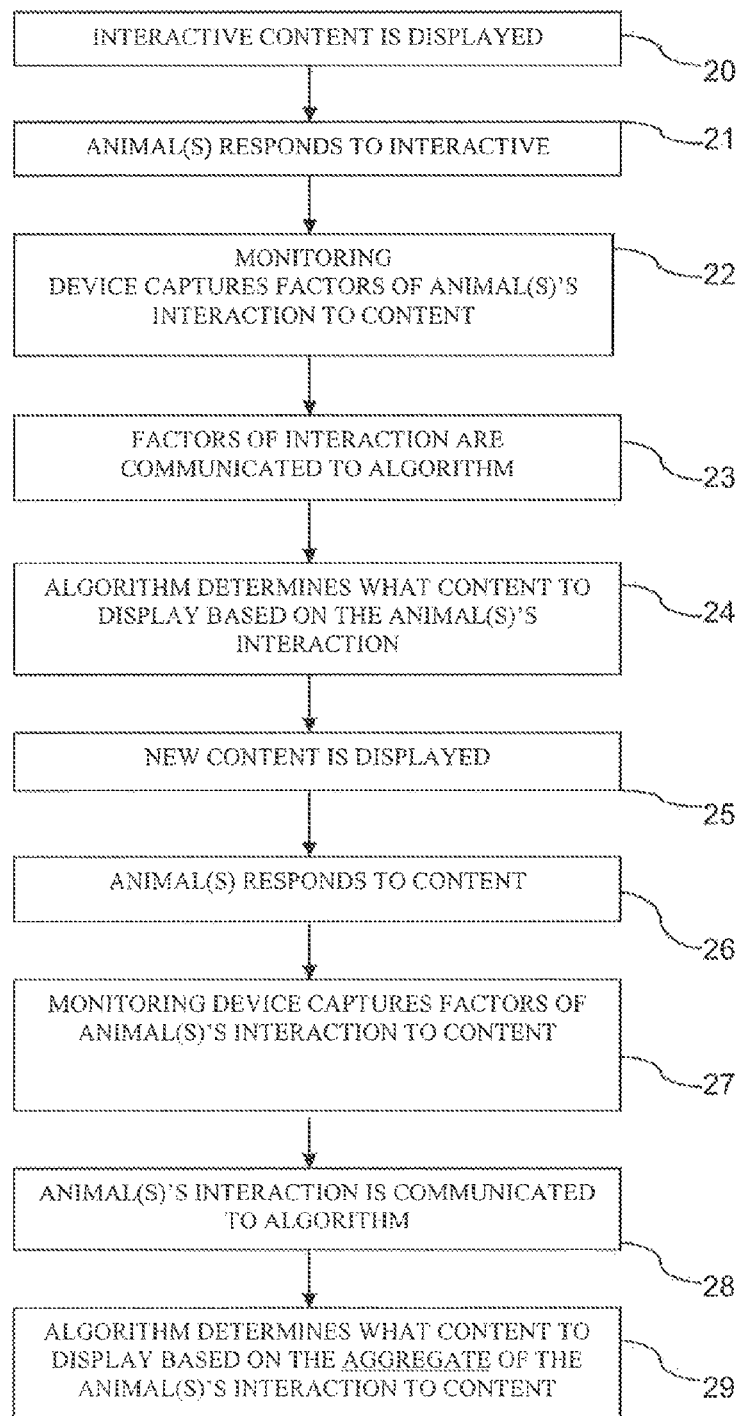
FIG. 2 is a flow diagram illustrating the process in which interactive media content is adjusted according to a pet(s)'s engagement/reactions.

As detailed in FIG. 2, the invention would also utilize the content determination algorithm to track a pet(s)'s response to interactive content. As interactive content is displayed 20, a pet(s) reacts to the content 21.

A SENSOR is utilized to collect factors of the pet(s)'s interaction and interest in the interactive content 22.

The factors of interaction and interest are communicated to the content determination algorithm 23.

A content determination algorithm determines what content to display based on the pet(s)'s measured interaction 24.

As new content is displayed 25, the pet(s) reacts to the content 26. A SENSOR captures the pet(s)'s interaction to the content extracts features 27 and the interaction is computed by the algorithm 28.

The algorithm then determines what content to display based on the aggregate of the pet(s)'s interaction to the content 29. This is being done in a continuous time loop.

Interactive content responds to a pet(s)'s movements, touches, and actions, for instance, licking.

For example, if a pet(s) chases an object, such as a mouse or firefly to the right, the mouse or firefly responds to the pet(s)'s movement potentially moving in the opposite direction or in a manner to engage the pet(s).

Numerous types of media content are provided as well as numerous potential outcomes.

Media content does not always instigate the same responses from a pet.

The time aspect and feedback from the device captures what type of content (such as mouse) and what types of movement (the mouse running in a circle or to the right or left) the pet(s) finds most engaging. The pet(s)'s engagement is captured by the device and interpreted by the algorithm. New content or re-ordering of existing content is decided based on the output of the algorithm. The algorithm is continuously improved based on the aggregate data from the feedback loop.

Figure 3:
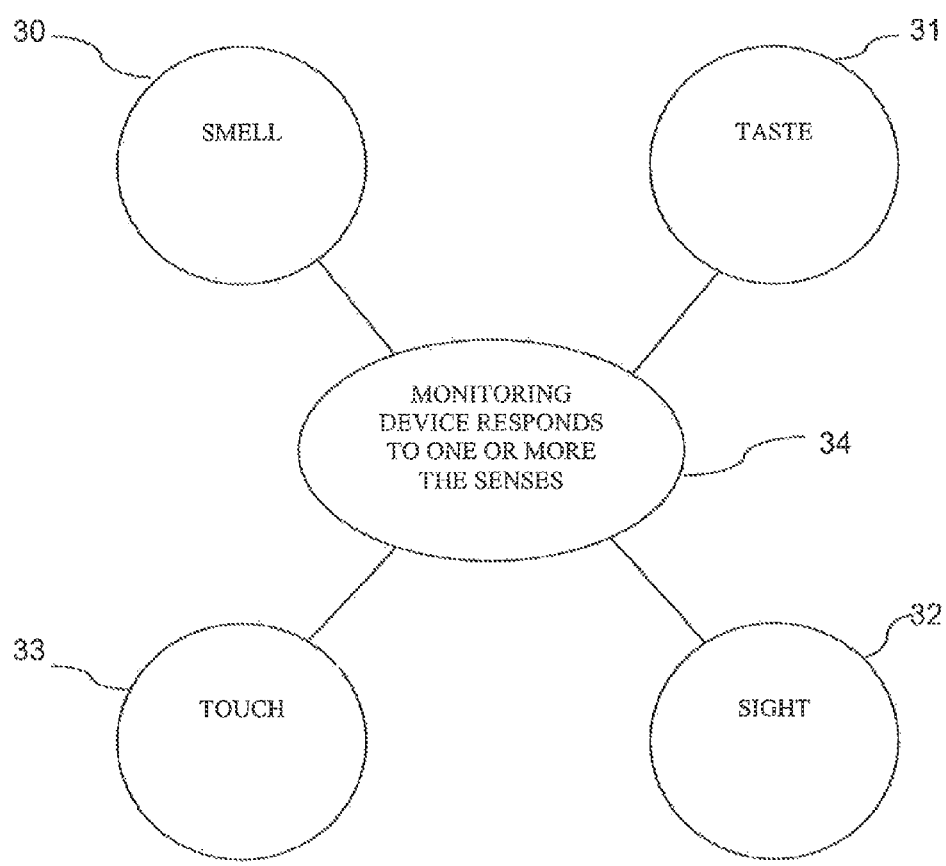
FIG. 3 is an illustration of what sense(s) the monitoring device, called SENSOR may capture.

In FIG. 3, the monitoring device 34 utilized to measure the pet(s)'s engagement/reactions would not be limited to capturing one input. The SENSOR 34 may capture one or more of four senses: smell 30, taste 31, touch 32, and sight 33.

A non-transitory computer-readable storage medium comprising a program (called content modification algorithm) for causing content modification that takes as input the SENSOR measurements and other historical or pre-computed data and determines what content to display based on the pet(s)'s measured interaction.

The content modification algorithm interposes algorithmically computed shapes and sounds overlaid on top of the existing content to attract the attention of the Pet observing the display.

It should be noted that references to "an" embodiment in this disclosure are not necessarily to the same embodiment, and they mean at least one. Flowcharts provided for the present invention may have alternative implementations of the functions noted in various steps or actions. The steps or actions may occur out of order, or may be executed substantially concurrently.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on packet management. However, one skilled in the art will recognize that embodiments of the invention could be applied to cellular communications, PTOS networks, Intranets, or other types of networks. Additionally, although some of the specific devices, such as the probing device packet analyzer or packet management device, are described as special purpose hardware devices, it is envisioned that such devices may be constructed from more general purpose hardware configured to function as operate as a specific device.

In addition, it should be understood that any figures which highlight the functionality and advantages, are presented for example purposes only. The disclosed architecture is sufficiently flexible and configurable, such that it may be utilized in ways other than that shown. For example, the steps or actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A system for selective display of visual and sound media content to a display device for pet entertainment based on measured and pre-classified content, comprising:
    a content display device displaying a first displayed content;
    at least one sensor continuously capturing at least one first input measuring at least one pet's engagement and reaction to the first displayed content, wherein the at least one first input measuring at least one pet's engagement and reaction to the first displayed content includes all of a directional movement, touching, tasting, smelling, and sight;
    a database storing at least one stored input of historical and pre-computed pet data of engagement and reaction to previously displayed content;
    a content determination algorithm programmed on a non-transitory computer-readable storage medium and operable to receive the at least one first input from the at least one sensor, and the at least one stored input from the database and instruct the content display device to display at least one second displayed content, wherein the at least one content determination algorithm operates on a continuous time loop to receive the at least one first input, and is continuously updated based on an aggregate of the at least one first input and the at least one stored input.

2. The system of claim 1, wherein the sensor measures the at least one pet's engagement and reaction to the at least one second displayed content to capture at least one second input.

3. The system of claim 2, wherein the content determination algorithm receives the at least one second input and instructs the content display device to display at least one third displayed content.

4. The system of claim 1, wherein the historical and pre-computed pet data is at least one of data of the at least one pet and data of at least one second pet.

5. The system of claim 1, wherein the content determination algorithm receives at least one of stored or streamed content that is pre-indexed.

6. The system of claim 1, wherein the sensor is at least one of an imaging camera, an infrared camera, and a motion sensor.

7. The system of claim 1, wherein the content display device includes at least one of a television screen, a computer monitor, a tablet, a cell phone, and an audio device.

8. The system of claim 1, wherein the database stores the at least one first input as a stored input.

9. The system of claim 1, wherein the at least one first content and the at least one second content are at least one of visual and audio content.

10. The system of claim 1, wherein the second displayed content is overlaid on top of the first displayed content.

11. A system for selective display of visual and sound media content to a display device for pet entertainment based on measured and pre-classified content, comprising:
    a content display device displaying a first displayed content;

at least one sensor capturing at least one first input measuring at least one pet's engagement and reaction to the first displayed content;
a database storing at least one stored input of historical and pre-computed pet data of engagement and reaction to previously displayed content;
a content determination algorithm programmed on a non-transitory computer-readable storage medium and operable to receive the at least one first input from the at least one sensor, and the at least one stored input from the database and instruct the content display device to display at least one second displayed content
wherein the at least one first input measurement the at least one pet's engagement and reaction to the first displayed content includes all of:
a directional movement;
touching;
tasting;
smelling; and
sight.

* * * * *